Sept. 26, 1961     T. H. WIANCKO ET AL     3,001,407
ACCELEROMETER

Filed Feb. 21, 1957     3 Sheets-Sheet 1

THOMAS H. WIANCKO
WILLIAM J. RIHN
LUDWIG R. VREUGDE
             INVENTORS

BY
           ATTORNEY

Sept. 26, 1961 T. H. WIANCKO ET AL 3,001,407
ACCELEROMETER
Filed Feb. 21, 1957 3 Sheets-Sheet 2
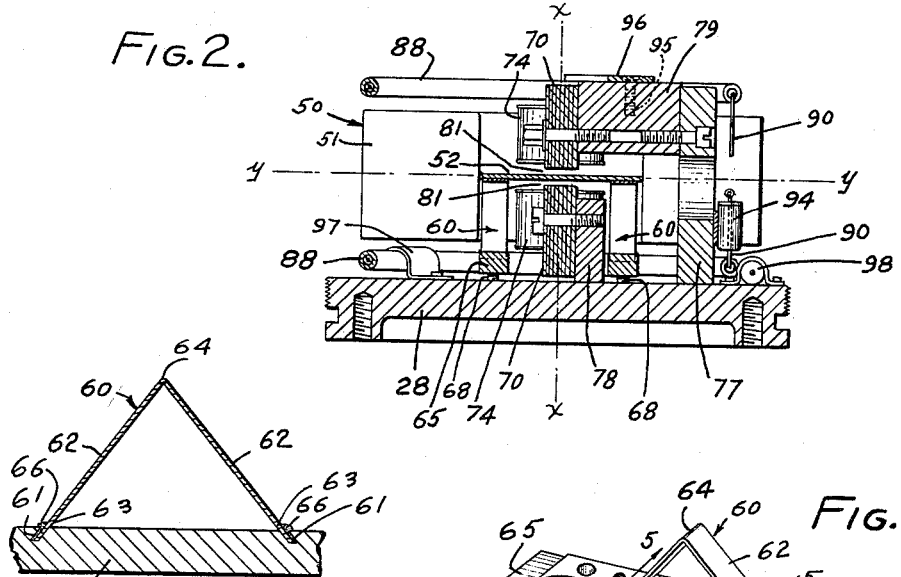
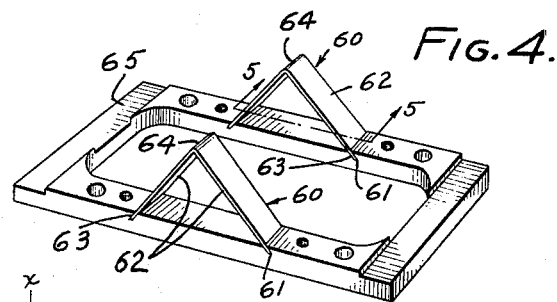
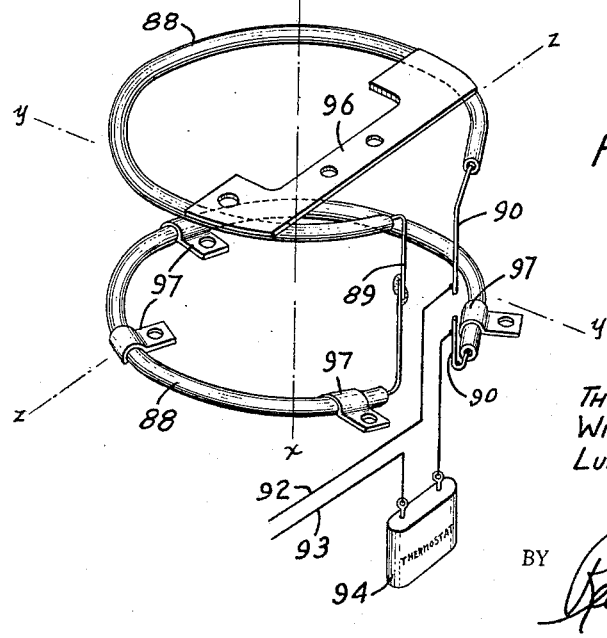
Thomas H. Wiancko
William J. Rihn
Ludwig R. Vreugde
INVENTORS
BY
ATTORNEY Sept. 26, 1961  T. H. WIANCKO ET AL  3,001,407
ACCELEROMETER
Filed Feb. 21, 1957  3 Sheets-Sheet 3

THOMAS H. WIANCKO
WILLIAM J. RIHN
LUDWIG R. VREUGDE
INVENTORS

BY
Reed b Lawlor
ATTORNEY 3,001,407
ACCELEROMETER
Thomas H. Wiancko, Altadena, William J. Rihn, Monrovia, and Ludwig R. Vreugde, Arcadia, Calif., assignors, by mesne assignments, to Daystrom, Incorporated, Murray Hill, N.J., a corporation of New Jersey
Filed Feb. 21, 1957, Ser. No. 641,545
3 Claims. (Cl. 73—497)

This invention relates to improvements in dynamic systems that are liable to be excessively strained when they are subjected to linear acceleration. More particularly, the invention relates to improvements in accelerometers, and especially to improvements in accelerometers that employ magnetic elements for detecting the motion of unbalanced inertia members immersed in damping oil that is temperature-regulated.

Introduction

Accelerometers are employed for many purposes. They are used not only to detect and measure acceleration, but they are also used as control elements to control the operation of an accelerating device. For example, accelerometers mounted on a guided missile are employed to detect components of acceleration of a guided missile, and the outputs of the accelerometers are employed through the aid of servo-mechanisms to stabilize the flight of the missile. The improved accelerometer of this invention is particularly adapted for the latter use, though many of its features may be advantageously employed for other purposes.

It is common to employ in such control systems, and also in systems for measuring acceleration, accelerometers of the variable-reluctance type in which the reluctance of a magnetic circuit is varied in response to the acceleration and in which the change in reluctance produces a change in amplitude of an alternating magnetic field existing in the magnetic circuit. A coil coupled with the magnetic circuit is employed to detect the changes in the magnetic field, the output of the coil being an amplitude-modulated carrier wave which represents the acceleration. Generally speaking, such a modulated wave is composed of a carrier wave component and a pair of sideband components which correspond in amplitude and frequency to each frequency component of the acceleration. In some cases, the carrier is suppressed. Each of the side-band frequencies differs from the carrier frequency by the frequency of the corresponding component of acceleration, and the amplitudes of each pair of sideband frequency components are proportional to the amplitude of the corresponding component of acceleration.

When an accelerometer is employed to control the operation of a device, such as the flight of a guided missile, it is very desirable to minimize the effects of high-frequency components of acceleration and to emphasize the effects of low-frequency components. One reason for this, as in the case of a guided missile, is that the device may be subject to two types of accelerations, first, a slow steady acceleration which would cause the guided missile to go off-course unless corrections for such acceleration were made in the course of flight, and, second, high-frequency locally generated components which average out in such a way that they do not seriously affect the flight path.

In order to provide an acceleration-responsive system that is particularly adapted for such use, two main courses are available. In one, narrow-band band-pass filters operating on the modulated carrier wave may be employed to highly attenuate the high-frequency components of the signals and to selectively transmit only low-frequency components of signals from the accelerometer to the control system. On the other hand, an accelerometer may be provided that has a low resonant frequency which lies between the band of acceleration frequencies which are useful in the control system, and the higher frequencies which are unimportant or which would only disturb or overload the control system. The design and construction of such narrow low-frequency band-pass filters is not easy. The design of an accelerometer having a low resonant, or natural, frequency is also fraught with many difficulties, some of which are mentioned below and which are overcome in accordance with this invention.

More particularly, in the design of an acceleration-responsive system for such control purposes, it is desirable to employ the components of acceleration which have frequencies which are very low, namely those below about 5 c.p.s. (cycles per second), and to eliminate or greatly reduce the effects of acceleration components having frequencies greater than about 5 c.p.s. One reason for this is that such a control system generally employs a servo-system which responds properly only to relatively low frequencies of control signals below about 5 c.p.s. but which may be rendered inoperative by high-frequency, high-amplitude components of the control signal above about 5 c.p.s.

An accelerometer which is suitably damped has a substantially uniform response to all frequencies below about the resonant frequency, and an attenuation which increases rapidly with frequency at frequencies above the resonant frequency. Advantage of this high mass-high compliance-low resonant frequency fact is taken in this invention to selectively emphasize the low-frequency components and attenuating the high-frequency components by designing the accelerometer to have a resonant frequency at about 5 c.p.s. The resonant frequency of an accelerometer, as is well known, is determined very largely by the mass of an inertia member and by the compliance of the resilient member or spring which supports the inertia member. To produce a low resonant frequency, the product of the mass and the compliance must be very large. If the mass of the inertia member is increased to lower the resonant frequency, there is danger of straining the resilient member excessively. In order to produce high compliance with a given mass, the spring is made very weak, again running the risk of excessive strain. We are thus faced with a dilemma if we desire to lower the resonant frequency of an accelerometer to a very low value and the spring cannot withstand the strain to which it is subjected in use.

The problem of designing a suitable resilient member is increased by the fact that accelerometers are very frequently subjected to strong accelerations, thereby tending to apply strong buckling forces to the resilient member, completely destroying its utility. This can easily happen, for example, in a guided missile where the values of acceleration produced momentarily may be many G's.

An accelerometer of the general type to which my invention is applicable is described in Patent No. 2,618,776 which issued to Thomas H. Wiancko November 18, 1952. The accelerometer there described employs a dynamically unbalanced seismic mass or inertia member resiliently suspended in damping oil by means of a dihedral spring. The inertia member includes an armature which is adapted to move in such a way as to vary the reluctance of magnetic circuits to which are coupled windings that are employed both to generate an alternating magnetic field in the magnetic circuit and to produce carrier-wave signals which are modulated with components which have amplitudes and frequencies corresponding to those of components of the acceleration being detected.

The main improvements provided by this invention involve the improved design of the inertia member and improvements in controlling the temperature of the oil. The invention includes other improvements too which contribute to the provision of a low-frequency accelerometer. Furthermore, some of these improvements are applicable to other kinds of instruments.

The principal object of the invention is to provide an improved accelerometer which selectively responds to accelerations having low-frequency components.

Another object is to provide an accelerometer which may be employed to detect accelerations of great magnitude without being seriously damaged.

Another object is to provide an accelerometer with an improved damping system in which the damping is regulated by controlling the temperature of the fluid.

Another object is to provide an instrument in which parts are immersed in oil with a temperature-regulating system which responds rapidly to changes in temperature of the fluid.

Another object is to provide such a temperature-regulating system which makes efficient use of the heat supplied by the heating elements.

Another object is to provide an instrument in which moving parts are immersed in oil with an oil-heating system in which convection currents are minimized so that forces produced by such convection currents are small.

Another object is to provide such an instrument with a heating system in which changes of currents in the heating coils produce very little, if any, spurious effects or other signals in the detecting system.

A further object is to provide in instrument with moving parts immersed in oil with means for maintaining the buoyancy and damping substantially constant.

A further object is to provide such an instrument with a system for regulating the temperature of the oil electrically with a minimum amount of power.

These and other objects of the invention, together with other features and advantages thereof, will appear more fully in the following detailed description of one embodiment of the invention. Although the invention is described with reference to only one specific embodiment thereof, it will be understood that it may be embodied in many other forms and that it may be applied in many ways without departing from the scope of the invention. It is therefore to be understood that the invention is not limited to the specific embodiment described, but that it is defined by the appended claims.

In the drawings, wherein like reference characters indicate like elements in the various figures:

FIG. 2 is a cross-sectional view taken on the plane 2—2 of FIG. 1;

FIG. 4 is a perspective view of the springs;

FIG. 5 is a sectional view of a dihedral spring taken on the plane 5—5 of FIG. 4;

FIG. 6 is an isometric schematic view showing parts of the heater system;

General

Figure 1:
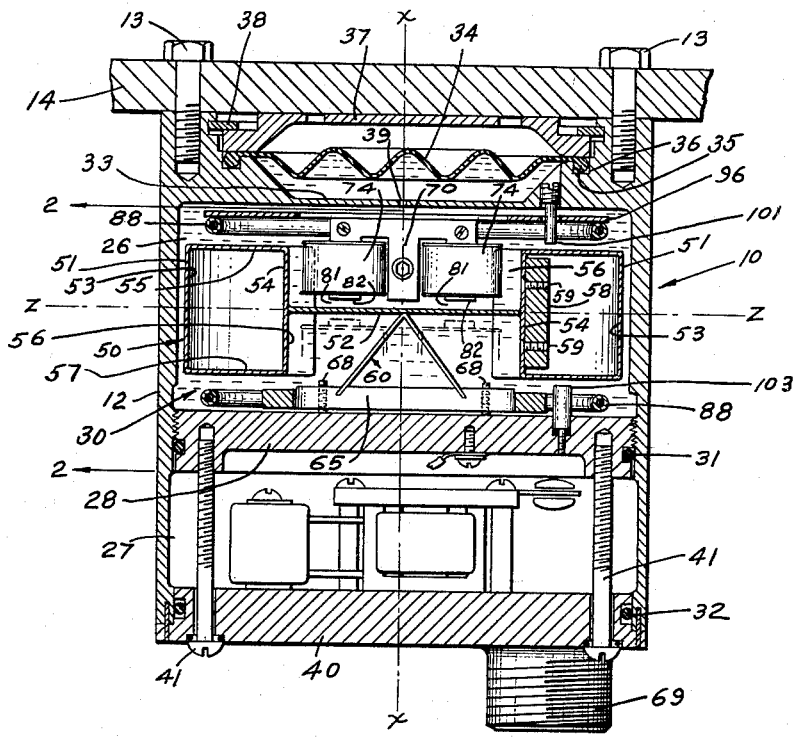
FIGURE 1 is a longitudinal cross-sectional view of an accelerometer embodying features of this invention.
Figure 3:
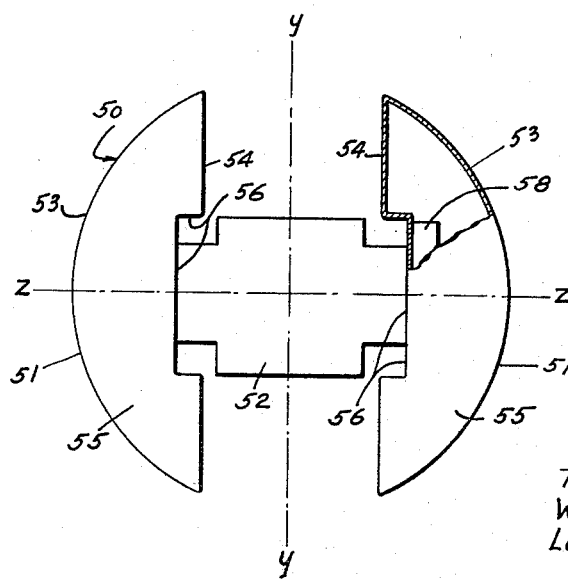
FIG. 3 is a transverse plan view of the inertia member with one of the pontoons partly broken away.
Figure 9:
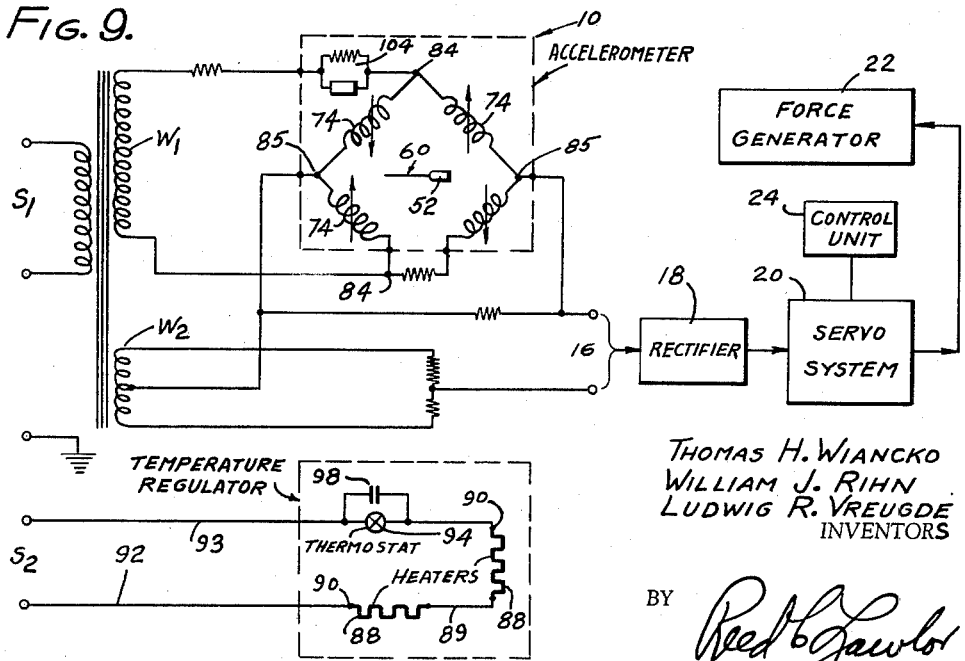
FIG. 9 is a schematic wiring diagram of the accelerometer and control system.

Referring to the drawings, and particularly to FIGS. 1 and 9, there is illustrated an accelerometer 10 embodying features of this invention and employed to control the acceleration of a device such as a guided missile by means of a servo-mechanism. The accelerometer 10 comprises a sealed cylindrical case 12, which is bolted by means of screws 13 to a part 14 of the missile which is being controlled. Various circuit elements such as illustrated in FIG. 9 are employed to produce a carrier wave at an output 16 which is amplitude-modulated with modulation components having frequencies corresponding to those of the acceleration being detected. In this specification, it will be assumed that in the absence of acceleration the output has a predetermined value different from zero. However, it will be understood that the invention is also applicable to a suppressed carrier system in which the output is zero when there is no acceleration. It will also be understood that the invention is applicable when other kinds of modulation methods are employed.

More particularly, the accelerations being detected are linear accelerations which are parallel to an acceleration-sensitive axis X—X which coincides with the axis of the cylindrical case 10. The amplitude-modulated carrier wave appearing at the output 16 is rectified by rectifier 18, and the rectified signal is applied to a servo-system 20 which operates a force generator 22 to produce a force which opposes a change in the acceleration along the axis X—X and hence stabilizes the acceleration at a value (such as zero), or a predetermined succession of values, established by a master control unit 24. The force generator itself may be a control for a fuel supply, or it may be a control for a rudder or an aileron, or other control surface, or it may be a control for any other device which affects the acceleration of the missile. The master control unit 24 may be any type of unit which is employed to set the value of the desired acceleration at a predetermined amount or to vary it in a predetermined manner.

For convenience, the accelerometer 10 will be described as if located on a guided missile with the acceleration-sensitive axis X—X parallel to the longitudinal axis of the guided missile, and normal to the yaw, or normally vertical, axis Y—Y of the gluided missile, and normal to the transverse axis Z—Z. It will, of course, be understood that in any complete control system a plurality of accelerometers are mounted on the guided missile with their acceleration-sensitive axes extending in different directions, and that they may be employed cooperatively to control the flight of the missile.

Housing

As shown in FIG. 1, the case 10 is divided into two compartments, a forward compartment 26 and a rear compartment 27, by means of a partition member or plate 28 threadably engaging the internal wall of the case intermediate its ends. The inertia member 50, or seismic mass, together with various associated parts, is immersed in a body of oil or other damping fluid 30 that fills the front compartment, while certain other auxiliary electrical parts are mounted in the rear compartment 27.

The forward wall of the case is formed in part by a resilient corrugated diaphragm 34 which expands and contracts as the volume of the body of oil 30 expands and contracts in response to changes of oil temperature. The diaphragm 34 is provided with a peripheral bead 35 which is held firmly in place within an annular groove 36 by means of an apertured end plate 37 and clamp 38, thus sealing the front wall 33 and still providing for expansion of the body of oil 30. The aperture 39 is centrally located, as taught in Patent No. 2,618,776, issued to Thomas H. Wiancko on November 12, 1952. The rear wall of the case 12 is formed by an end plate which is rigidly mounted on the partition plate 28 by means of bolts 41.

The compartments 26 and 27 are sealed from each other and from the atmosphere by means of O-rings 31 and 32 or other suitable sealing means and by the diaphragm bead 35.

Spring structure

The inertia member 50 is resiliently supported within the forward compartment 26 by means of a resilient member comprising a pair of dihedral springs 60, as shown in FIGS. 1, 2, and 4.

Each of the dihedral springs 60 comprises a pair of straight legs 62 that intersect at slightly less than a right angle at an apex 64. The feet 63, that is the ends of the springs remote from the apices, are firmly secured in inclined slots 61 of a base plate 65 by means of silver solder 66. The adjustment screws 68 are employed to orient the base plate 65 and hence the dihedral springs 60 relative to the partition 28, thereby orienting the inertia member in the case. The corresponding legs 62 of the two springs are coplanar, and the apices 64 of the two springs are collinear so that, in effect, the pair of springs form a divided dihedral spring member having two parts which are spaced apart along the rotation axis Y—Y, which in this case coincides with the yaw axis.

Inertia member

The inertia member 50 is of symmetrical design and is formed by a pair of pontoons or hollow mass members 51 that are rigidly supported at the outer ends of an armature 52 in the form of a plate which is welded to the two dihedral springs 60 at their apices 64. The two pontoons are of the same external shape and size, being in the form of cylindrical sectors having generatrices parallel to each other and normally parallel to the acceleration-sensitive axis X—X. The two pontoons 51 are symmetrically located with respect to the acceleration-sensitive axis X—X, and their outer cylindrical walls 53 are concentric, forming arcs of a common circular cylinder. The inner walls 54 are provided with central recessed portions 56 at the points of attachment of the pontoons to the ends of the armature 52. The upper walls 55 of the two pontoons are coplanar and normal to the generatrices. Likewise the lower walls 57 of the two pontoons 51 are coplanar and normal to the generatrices. The masses of the pontoons are large compared with the mass of the armature.

Magnetic structure

Parts of the armature 52 are included in four variable-reluctance magnetic circuits which are provided by a pair of opposed laminated E-shaped magnetic structures or cores 70. Each of these structures has two outer legs and an inner leg. Four windings or coil members 74 are mounted on the four outer legs. The E-shaped members are supported rigidly in place on the partition plate 28 by means of an outer post 77 and an inner post 78, a spacer block 79, and suitable screws, as shown in FIG. 2, with their legs opposed. Three gaps 81 are formed between the opposed faces of adjacent legs of the magnetic structures 70, and the armature is mounted concentrically within these gaps, normally lying in a neutral plane normal to the acceleration axis X—X. Thus the two pontoons 51, the armature 52, the springs 60, and the magnetic structures 70 and windings 74 are all symmetrically arranged within the compartment 26, the arrangement being symmetrical about each of the three planes formed by pairing of axes X—X, Y—Y, and Z—Z. The arrangement is also diametrically symmetrical about the center of the compartment 26. The inertia member, however, is dynamically unbalanced about the rotation axis Y—Y. When the accelerometer is subjected to acceleration along the axis X—X, it rotates about the rotation axis Y—Y by an amount proportional to the acceleration.

The unbalance is established by mounting an unbalancing mass member 58 within one of the pontoons. In practice, the mass member 58 is attached to the inner surface of a wall 56 where, in effect, it is substantially rigidly supported at a point near an end of the armature 52. Screws or rivets 59 are employed to hold the mass member 58 rigidly in place.

Circuitry

As indicated in FIG. 9, the four windings 74 are connected in the arms of a bridge circuit. A carrier wave supplied from a source $S_1$ is impressed across the input diagonal of the bridge circuit, thereby generating alternating magnetic fields in the magnetic structures 70. Each of the outer legs of each magnetic structure 70 provides a variable-reluctance path which includes the center leg of that magnetic structure and also an adjacent part of the armature 52. The windings are so connected and arranged that the magnetic flux fields that pass through two opposite variable-reluctance circuits oppose each other in the part of the armature that is included in the two circuits, thus tending to neutralize each other and reducing the total amount of flux passing through that part of the armature at any one time. Likewise, the windings 74 are so connected in the bridge circuit of FIG. 9 that the bridge circuit becomes unbalanced when the armature is rotated about the rotation axis Y—Y. The manner of constructing and arranging and connecting the magnetic structures 70, and the windings 74 in relation to the armature, is well known to those skilled in the art and need not be described here in detail.

Connections to the various circuit elements within the case 12 are made by means of an electrical connector 69 sealed in the rear wall of the case.

With such an arrangement, a carrier wave of relatively high frequency, say 1,000 c.p.s., is applied across two terminals 84 at the input diagonal of the bridge, causing a modulated carrier wave to appear across the two terminals 85 at the output diagonal of the bridge. The bridge circuit is normally unbalanced and the output has a constant amplitude when no acceleration is occurring. But when the accelerometer 10 is subjected to linear acceleration along the acceleration-sensitive axis X—X, the inertia member 50 rotates about the rotation axis Y—Y. Such rotation changes the values of reluctance of the four magnetic circuits associated with the four windings 74, causing the amplitude of the carrier wave appearing across the output 16 to be changed by an amount proportional to the rotational displacement of the inertia member 50 from its neutral position and hence proportional to the acceleration. When the acceleration is changing an amplitude-modulated carrier-frequency wave is produced at the output 16.

Spring buckle

In the ordinary accelerometer, such as that illustrated in the aforementioned Patent No. 2,618,776, the inertial force produced by linear acceleration of the inertia member in the direction of the acceleration-sensitive axis X—X creates a thrust that tends to buckle the dihedral springs 60. Accordingly, when the acceleration reaches a high value, such as many G's, this thrust may permanently distort the springs 60, upsetting the balance of the system and changing its sensitivity or even disabling the accelerometer entirely. This is especially true if the accelerometer has a low resonant frequency such as 5 c.p.s. as in this case the spring must be very weak in relationship to the mass of the inertia member.

Buoyancy and damping

Difficulties otherwise encountered by the creation of such thrust forces are eliminated in accordance with this invention by making the mass of the inertia member 50 substantially equal to the mass of the displaced fluid. Expressed differently, the mass of the inertia member is nearly the same as the mass of an equal volume of the oil that fills the compartment 26. As employed herein, the term "buoyancy factor" F is the ratio of the effective weight of the inertia member to the volume of the displaced fluid. In other words, the buoyancy factor is $$F = \frac{\rho V - W}{V}$$

where $\rho$ = density of the oil
$W$ = weight of the inertia member
$V$ = volume of the inertia member.

When the buoyancy factor of the inertia member is zero, the buoyant force $\rho V$ on the inertia member is equal to its weight in vacuo, so that if the inertia member is free, it tends neither to float nor to sink in the oil. If the mass of the inertia member is less than or greater than the mass of the displaced oil, then the buoyancy factor is positive or negative, respectively. Some advantages of the invention may be achieved even though the buoyancy factor departs from zero. But for best results the buoyancy factor is made substantially zero.

By employing an inertia member which has a substantially zero buoyancy factor in the body of oil 31, the thrust forces exerted by the inertia member 50 on the springs 60 during acceleration in any direction are substantially eliminated. Consequently, by employing an inertia member having a substantially zero buoyancy factor in the oil, an accelerometer is provided which may be employed to measure higher values of acceleration than would be possible without employing that buoyancy relationship. Furthermore, an accelerometer having a very low resonant frequency is provided.

The establishment of a zero buoyancy factor is accomplished in part by employing substantially empty hollow mass members 51 or pontoons. Normally, the oil has a low specific gravity of about 1.0 or less, and the pontoons 51 and the armature 52 are made of metal that has a specific gravity much greater than 1.0, such as a specific gravity of about 8.0. For this reason, in order to establish a low buoyancy factor, the volume of the space within the pontoons is made very large compared to the total volume of metal employed in the inertia member 50. It will be understood that some advantages of the invention can be achieved even if the buoyancy is not exactly zero but is only greatly reduced to substantially zero, that is, to a point where the effective weight of the immersed inertia member is only a small percentage, such as 1% or 2%, of the weight of the inertia member in vacuo.

While the volume of the pontoons 51 is a large factor in determining the value of the buoyancy factor, both the volume and the shape of the pontoons affect both the effective inertia of the system and the damping effects of the oil. It is to be noted in this case that the pontoons are in the shape of paddles that have a large cross-sectional area in planes transverse to the directions of movement of the pontoons within the compartment 26, thus increasing the effective moment of inertia and the damping coefficient. In practice, an oil mixture having a low temperature coefficient of viscosity is employed, and the inertia member is designed to have substantially zero buoyancy at an elevated temperature, such as 160° F., at which the viscosity has such a value as to provide a predetermined damping coefficient.

A predetermined viscosity value is established by blending silicone oils which have different properties. For this purpose, a series of silicone oils manufactured by Dow Corning Corp., Midland, Michigan, and sold under the trade name DC-200 have proved to be very suitable. These oils all have about the same density but have widely different values of viscosity. Such oil has a temperature characteristic defined by the equation:

$$0.61 = 1 - \frac{\nu_{210}}{\nu_{77}}$$

where $\nu_{210}$ = viscosity at 210° F; and
$\nu_{77}$ = viscosity at 77° F.

Thus, by blending such silicone oils, a set of oil mixtures can be produced, all of which have about the same predetermined density but different values of viscosity. Such blending can be employed to change the damping effects of the oil, while preserving the buoyancy effects substantially unchanged.

The blending of the silicone oils is performed in such a way that the viscosity of the oil mixture at an elevated temperature is of such a value as to produce the desired damping coefficient as determined by actual measurements made with the accelerometer. Blends of such oils having a specific gravity of about 0.98 and a viscosity of about 50 to 500 centistokes at 160° F. have been successfully employed, depending on the exact design of the accelerometer and on the resonant frequency.

In the arrangement described, no change occurs in the neutral plane, or zero-acceleration position, of the armature when the temperature of the oil is changed. The reason for this is that by employing two pontoons of equal volume equally spaced from the rotation axis Y—Y, the two buoyant forces produced on the two pontoons respectively caused by a change in density of the fluid, are equal and opposite. A similar neutralizing or counterbalancing of buoyant forces produced by a change of oil density is achieved by employing a symmetrical pontoon arrangement in which the pontoons have equal volume moments about the rotation axis. Stated more broadly, the system is constructed with the center of buoyancy or volume of the inertia member on or very near the axis of rotation Z—Z. It is to be noted that the volume moment is less about an axis passing through the center of buoyancy than about any other axis parallel thereto. The center of buoyancy, it is to be noted, is in the same position that the center of gravity would be if the entire volume of the inertia member were composed of a material of uniform density. The actual center of gravity of the inertia member and the axis of rotation define the neutral plane of the inertia member and armature, which plane is normal or nearly normal to the acceleration-sensitive axis X—X to reduce effects of transverse acceleration, and the axis of rotation is located on or near the center of buoyancy to reduce effects due to a change in density of the fluid.

*Heating system*

A fixed value of buoyancy factor and damping is achieved by regulating the temperature of the oil. The regulatory heating is achieved electrically without introducing disturbances when the value of the heating current is changed.

The regulation of the temperature of the body 30 of oil is accomplished by means of a heating system that includes a pair of circular single-turn heater coils 88 immersed in the oil. The two heater coils are mounted in parallel planes on opposite sides of the armature and adjacent the opposite ends of the compartment 26. The two heater coils 88 are of the same size and shape, and they are so connected that when the same current passes through them, opposing or balancing magnetic fields are produced by the two coils in the intervening space, producing no field at all at the center. This result is achieved in part by connecting two adjacent ends of the two coils together by means of a conductor 89, as illustrated in FIG. 6, and supplying current to the two heater coils 88 by means of leads 92 connected to collinear terminals 90. The conductor 89 and the two terminals 90 extend along lines parallel to the rotation axis X—X.

With this arrangement, the strength of the magnetic field produced by the two coils in the armature 52 and in the magnetic structures 70 is maintained at a minimum value. By employing heaters arranged to produce substantially zero magentic field on the armature and minimum magnetic field at the positions of the pontoons and minimum magnetic field at the positions of the magnetic structures 70 and the coils 74, numerous difficulties are avoided. With this arrangement, mechanical impulses that would be otherwise impressed on the inertia member 50 due to the change in the current when the thermostatic switch 94 opens or closes are minimized. Furthermore, switching voltages that would be induced in the coils 74 are minimized. Another advantage of employing two heaters that produce little magnetic field lies in the fact that the field in the magnetic cores 70 change little between the full-current and no-current conditions. As a result, the effective permeability of the cores is not changed much when the current is switched on and off. Changes in such magnetic field, therefore, have little effect on the output of the bridge circuit.

The front heater coil 88 is rigidly supported in the compartment 26 by means of a bar 96 fastened to the block 79 by means of screws 95. The rear coil 88 is supported on the partition plate 28 by means of clamps 97. It will be noted that stops 101 and 103 are threadedly secured to the base and to the partition plate 28 respectively to limit the movement of the inertia member 50, the stops being located opposite the end walls 55 and 57 of the heavier pontoon.

A thermostatic switch 94 is connected in series with one of the leads 92. Like the heater elements 88, the thermostatic switch 94 is immersed in the body 30 of oil. A small condenser 98, which is connected across the terminals of the thermostatic switch 94, is also immersed in the oil. This arrangement has the advantage that the thermostatic switch responds rapidly to changes in temperature of the oil, and the oil is directly heated by the heaters 88, thus minimizing loss of heat to the external environment, and regulating the temperature of the oil closely for a given amount of electric power, thus requiring less power to achieve a required amount of temperature regulation. Furthermore, by mounting the heater coils in the fluid rather than externally of the case, the time required to raise the temperature from an ambient or room-temperature value to an operating value is reduced.

Electric power is supplied to the heaters from a source $S_2$ of direct current, as indicated in FIG. 9. The heater current may also be alternating current. If alternating current is employed, the frequency of the alternating current should be different from the frequency of any component of the modulated wave impressed on the servo-system 20.

A temperature-compensating resistance network 104, that is employed in accordance with the teachings of Patent No. 2,657,353 issued to Thomas H. Wiancko on October 27, 1953, in order to eliminate certain other effects of temperature changes on the windings 74, is also immersed in oil. Other parts of the bridge network including, for example, a transformer, are mounted in the rear compartment 27. The latter components are rather bulky. By mounting them in the auxiliary compartment 27, the volume of the compartment 26 is minimized, so far as such minimization is compatible with the use of an inertia member 50 and magentic structures 70 of predetermined size.

Convection currents

Figure 7:
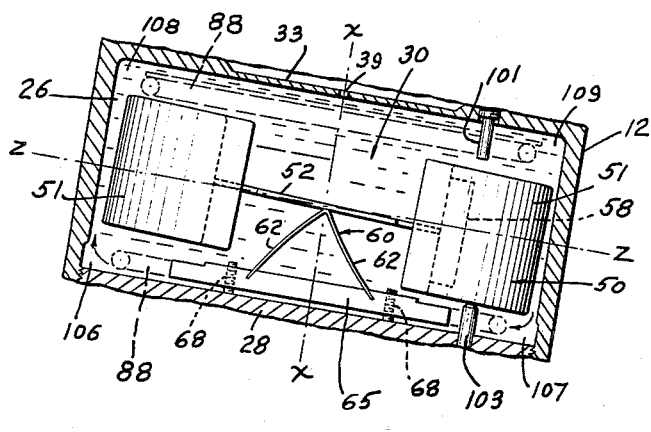
FIG. 7 is a fragmentary view of the accelerometer employed to explain the effects of convection currents.

The action of the two heater coils 88 in minimizing effects of convection currents can be understood by reference to FIG. 7. Assume for a moment that the accelerometer is mounted with the acceleration axis X—X extending upwardly but inclined somewhat from the vertical. In this case, it is clear that if only the lower heater coil 88 is in use, parts of the oil at positions 106 and 107 adjacent the partition plate 28 will be affected most quickly by heat generated in the heater coil. As a result, the oil being heated at position 106 will tend to produce a convection current circulating in a clockwise direction about the left-hand pontoon 51. Likewise, the oil being heated at position 107 produces a clockwise convection current around the right-hand pontoon. These two clockwise convection currents apply a clockwise torque to the inertia member, causing it to be displaced clockwise relative to the rotation axis Y—Y. Thus such currents shift the neutral plane of the inertia member changing the output of the bridge circuit, in effect creating a spurious effect that might be attributed to or mistaken for acceleration of the entire instrument along the axis X—X.

But, by employing a second heater coil 88 at the upper side of the inertia member in accordance with this invention, the temperature of the oil at positions 108 and 109 directly above the two positions 106 and 107 is raised simultaneously with the temperature of the oil at the latter positions. By virtue of this fact, any circulating currents are reduced, and any residual effects are minimized by virtue of the fact that the inertia member and the compartment are symmetrical with respect to the plane formed by the axes X—X and Y—Y and with respect to the neutral plane formed by the axes X—X and Z—Z.

Thus, when only a single heater coil is employed, the resultant convection currents are liable to produce a spurious accelerometer response, but when two heater units are employed and they are symmetrically located with respect to the remainder of the system in the compartment 26, counterbalancing convection currents are produced and such spurious effects are substantially completely eliminated.

Response curve

Figure 8:
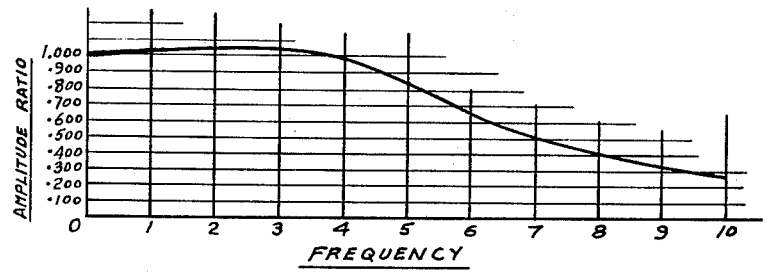
FIG. 8 is a graph of the frequency-response characteristics of the accelerometer.

A typical response curve of an accelerometer embodying this invention is illustrated in FIG. 8. The particular response curve drawn represents the response characteristic of the accelerometer when it has a damping coefficient that is 60% of the critical value. Here it will be noted that the resonant or natural frequency is 5 c.p.s. without damping. A response curve of the type illustrated in FIG. 8 corresponds to one in which the effective moment of inertia of the inertia member and the oil is about 1.25 pound-inches$^2$, and in which the spring constant is about 7 pound-inches per radian, and in which the viscosity of the oil is adjusted to produce a correct damping coefficient that is 60% of the critical value. In this case, the viscosity of the oil is about 50 to 150 centistokes, depending upon the clearance of the inertia member with respect to the case and the parts other than the inertia member mounted within the case.

It is to be noted that with a response curve such as that illustrated in FIG. 8, for components of acceleration below about 4 c.p.s., the response of the accelerometer is substantially uniform, and that at high frequencies above about 6 c.p.s. the response diminishes at the rate of about 12 db/octave. Such an accelerometer, in effect, constitutes a mechanical filter which transmits low-frequency components of acceleration as electrical signals of corresponding frequency to the output 16, but which attenuates the transmission of any high-frequency components as electrical signals to the output 16. By employing such an accelerometer, the need for employing a narrow-band band-pass filter in the network between the output 16 and the servo-system 20 is eliminated.

Conclusion

From the foregoing description and explanation, it will now be apparent that this invention provides a low-frequency accelerometer which may be relied upon to respond to acceleration accurately under extreme conditions of use. The accelerometer may be employed to measure large low-frequency accelerations without responding to high-frequency components of acceleration, and it may be employed under a wide variety of ambient temperature conditions without change of sensitivity and with shift of the output for zero acceleration. Though the invention has been described only with reference to its application to the detection of linear acceleration, it may also be employed to detect angular acceleration. In this latter case a balanced or symmetrical mass distribution is employed so that the inertia member produces no response to a linear acceleration. In such a case, the angular acceleration of the accelerometer about the rotation axis Y—Y causes the oil to circulate relative to the case, thereby displacing the inertia member from its position in a neutral plane. An angular accelerometer employing principles of this type is described in Patent No. 2,759,157, which issued to Thomas H. Wiancko on August 14, 1956.

It is thus seen that though the present invention has been described only with reference to a specific embodiment thereof, it may be embodied in many other forms. It will therefore be understood by those skilled in the art that various changes may be made in the material, form, details of construction, and arrangement of the elements without departing from the scope of the invention as defined by the appended claims.

The invention claimed is:
1. In an accelerometer, the combination of:
   a housing containing fluid;
   an inertia member immersed in said fluid, said inertia member comprising a pair of pontoons interconnected by a magnetic armature;
   a resilient torsion member connected to support said inertia member in said fluid for rotation relative to said housing about an axis of rotation, said pontoons being of unequal mass but of substantially the same external shape and being symmetrically located relative to said axis of rotation, said pontoons and said armature defining a neutral plane transverse to an acceleration axis, said inertia member having a substantially zero buoyancy factor in said fluid but being dynamically unbalanced about said axis of rotation whereby said inertia member rotates about said axis of rotation in response to acceleration of said housing in a direction parallel to said acceleration axis; and
   means including a detecting coil mounted in inductive relationship with said armature for detecting rotation of said inertia member about said rotation axis.

2. In an accelerometer, the combination of:
   a housing containing fluid that has a density that changes with temperature;
   an inertia member immersed in said fluid, said inertia member and said housing being symmetrical in volume outline relative to two axes of symmetry passing through the center of buoyancy of said inertia member;
   a resilient torsion member connected to support said inertia member in said fluid for rotation relative to said housing about an axis of rotation passing through the center of buoyancy, said inertia member defining a neutral plane transverse to an acceleration axis normal to said rotation axis, said inertia member being dynamically unbalanced about said axis of rotation whereby said inertia member rotates about said axis of rotation in response to acceleration of said housing in a direction parallel to said acceleration axis;
   means including a detecting coil mounted in inductive relationship with said inertia member for detecting rotation of said inertia member about said rotation axis;
   two heater coils immersed in said fluid, said coils being of substantially the same shape and being symmetrically located with respect to said axes of symmetry; and
   means for supplying electric current to said heater coils whereby the heat from the two coils reduces torque due to convection currents; said inertia member including unbalanced pontoons at opposite ends thereof, and said heater coils being disposed on opposite sides of said inertia member and its pontoons.

3. In an accelerometer, the combination of:
   a housing containing fluid that has a density that changes with temperature;
   an inertia member immersed in said fluid, said inertia member and said housing being symmetrical in volume outline relative to two axes of symmetry passing through the center of buoyancy of said inertia member;
   a resilient torsion member connected to support said inertia member in said fluid for rotation relative to said housing about an axis of rotation passing through the center of buoyancy, said inertia member defining a neutral plane transverse to an acceleration axis normal to said rotation axis, said inertia member being dynamically unbalanced about said axis of rotation whereby said inertia member rotates about said axis of rotation in response to acceleration of said housing in a direction parallel to said acceleration axis;
   means including a detecting coil mounted in inductive relationship with said inertia member for detecting rotation of said inertia member about said rotation axis;
   two heater coils immersed in said fluid, said coils being of substantially the same shape and being symmetrically located with respect to said axes of symmetry; and
   means for supplying electric current to said heater coils whereby the heat from the two coils reduces torque due to convection currents; said inertia member including unbalanced pontoons at opposite ends thereof, and said heater coils being disposed on opposite sides of said inertia member and its pontoons, said heater coils possessing substantially zero mutual inductance.

References Cited in the file of this patent

UNITED STATES PATENTS

| | | |
|---|---|---|
| 2,033,127 | Dunlea | Mar. 10, 1936 |
| 2,618,776 | Wiancko | Nov. 18, 1952 |
| 2,657,353 | Wiancko | Oct. 27, 1953 |
| 2,713,097 | Wooten | July 12, 1955 |
| 2,778,624 | Statham | Jan. 22, 1957 |
| 2,802,956 | Jarosh et al. | Aug. 13, 1957 |
| 2,855,495 | Grant | Oct. 7, 1958 |
| 2,888,256 | Sedgfield | May 26, 1959 |

FOREIGN PATENTS

| | | |
|---|---|---|
| 1,001,705 | France | Oct. 24, 1951 |